United States Patent
Tseng et al.

(10) Patent No.: US 7,623,591 B2
(45) Date of Patent: Nov. 24, 2009

(54) DIVERSITY RECEIVER

(75) Inventors: Ya-Ti Tseng, Chu Pei (TW);
Wen-Sheng Hou, Chung Li (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 585 days.

(21) Appl. No.: 11/477,929

(22) Filed: Jun. 30, 2006

(65) Prior Publication Data
US 2007/0098122 A1  May 3, 2007

(30) Foreign Application Priority Data
Oct. 27, 2005 (TW) .............................. 94137588 A

(51) Int. Cl.
*H04K 1/02* (2006.01)
*H04L 1/00* (2006.01)
(52) U.S. Cl. ...................................... 375/296; 375/346
(58) Field of Classification Search ................. 375/267, 375/148, 350, 349, 260, 343, 346; 455/67.13, 455/423, 501

See application file for complete search history.

(56) References Cited

U.S. PATENT DOCUMENTS

| 2002/0196842 A1* | 12/2002 | Onggosanusi et al. ....... 375/148 |
| 2004/0203456 A1* | 10/2004 | Onggosanusi et al. ..... 455/67.13 |
| 2005/0047515 A1* | 3/2005 | Walton et al. ............... 375/267 |
| 2005/0281358 A1* | 12/2005 | Bottomley et al. .......... 375/343 |

* cited by examiner

*Primary Examiner*—Khai Tran
(74) *Attorney, Agent, or Firm*—Muncy, Geissler, Olds & Lowe, PLLC

(57) ABSTRACT

A diversity receiver includes N number of Fourier transform circuits, N number of channel estimators, N number of match filters, N number of soft demappers, a combination/selection unit, and a channel decoder. The diversity receiver merges the square of the absolute value of estimate channel frequency response and transmission data into a demodulation signal and then outputs the demodulation signal by means of the match filter.

18 Claims, 3 Drawing Sheets

DIVERSITY RECEIVER

BACKGROUND OF THE INVENTION (a) Field of the Invention

The invention relates to a diversity receiver, and particularly to a diversity receiver for an orthogonal frequency division multiplexing (OFDM) system.

(b) Description of the Related Art

A typical orthogonal frequency division multiplexing (OFDM) system, one kind of multi-carrier system (MCS), includes a transceiver and a receiver. The OFDM system can provide considerably high bandwidth utilization efficiency to result in a high data transmission rate, because all sub carriers transmitted from the transceiver are orthogonal to each other and are individually modulated. Besides, the orthogonality between different sub-carriers may effectively diminish multi-path fading. Therefore, the OFDM system is suitable for various wireless communication systems, such as wireless local area network (WLAN) and fourth-generation (4G) mobile communication.

However, in a time-variant channel, interference between different sub-carriers and rapid channel fading (frequency-selective fading) may seriously degrade system performance and cause a high bit error rate to result in an error floor, even channel estimation and equalization treatments are indeed performed by the receiver.

Hence, a diversity reception technique is proposed to solve the aforesaid problems, which is widely used in various applications and particularly for mobile reception. Typically, a diversity receiver includes at least two antennas and their respective signal processing units for subsequent treatments. The two antennas are separately provided for receiving different versions of the same transmitted signal, and the signal processing units are used to combine input signals from different transmission paths.

Referring to FIG. 1, a conventional diversity receiver 10 includes two branches 11 and 12 having similar components, a combination/selection unit 1a, and a Viterbi decoder 1b. The branch 11 includes a Fourier transform circuit 111, a channel estimator 112, a channel equalizer 113, and a soft demapper 114. Further, the branch 12 includes a Fourier transform circuit 121, a channel estimator 122, a channel equalizer 123, and a soft demapper 124.

When a transmitter (not shown) transmits a first version input signal $I_1(n,k)$ regarding a $n_{th}$ symbol and a $k_{th}$ sub-carrier (n and k are positive integers) to the diversity receiver 10, the Fourier transform circuit 111 receives the first version input signal $I_1(n,k)$ via an antenna and transforms it into a first frequency-domain signal $Y_1(n,k)$. On the other hand, when the transmitter transmits a second version input signal $I_2(n,k)$ regarding a $n_{th}$ symbol and of $k_{th}$ sub-carrier to the diversity receiver 10, the Fourier transform circuit 121 receives the second version input signal $I_2(n,k)$ via an antenna and transforms it into a second frequency-domain signal $Y_2(n,k)$. The mathematical models for the frequency-domain signals $Y_1(n,k)$ and $Y_2(n,k)$ are given by the following equation:

$$Y_1(n,k)=H_1(n,k)S_1(n,k)+V_1(n,k)$$

$$Y_2(n,k)=H_2(n,k)S_2(n,k)+V_2(n,k) \quad (1.1)$$

where $H_1(n,k)$ and $H_2(n,k)$ are respective channel frequency responses of the first and second versions of input signals $I_1(n,k)$ and $I_2(n,k)$, $S_1(n,k)$ and $S_2(n,k)$ are transmission data transmitted by the transmitter, and $V_1(n,k)$ and $V_2(n,k)$ are additive white Gaussian noises (AWGN). The relationship between additive white Gaussian noises of different channels is given by:

$$\sigma_{v_1}^2 \neq \sigma_{v_2}^2$$

which indicates the signal variants of the branch 11 are different to that of the branch 12, i.e. the background noises of the branch 11 and that of the branch 12 are different to each other. However, it should be noted the above relationship does not mean the noises $V_1(n,k)$ and $V_2(n,k)$ are completely unrelated.

The channel estimator 112 fetches the first frequency-domain signal $Y_1(n,k)$ and evaluates the estimate value of the channel frequency response $H_1(n,k)$ according to a reference signal (such as a pilot signal) contained in the first frequency-domain signal $Y_1(n,k)$. Then, the estimate value of the channel frequency response $H_1(n,k)$ is fed to the channel equalizer 113. Similarly, the channel estimator 122 outputs the estimate value of the channel frequency response $H_2(n,k)$ to the channel equalizer 123. The channel equalizer 113 receives the first frequency-domain signal $Y_1(n,k)$ and generates a signal $M_1(n,k)$ according to the estimate value of the channel frequency response $H_1(n,k)$. Similarly, in the second branch 12, the channel equalizer 123 generates another signal $M_2(n,k)$ through the same treatments. The signals $M_1(n,k)$ and $M_2(n,k)$ are given by:

$$M_1(n,k)=|H_1(n,k)|^2 S_1(n,k)+H_1^*(n,k)V_1(n,k)$$

$$M_2(n,k)=|H_2(n,k)|^2 S_2(n,k)+H_2^*(n,k)V_2(n,k) \quad (1.2)$$

where $H_1^*(n,k)$ and $H_2^*(n,k)$ are respective complex conjugates of $H_1(n,k)$ and $H_2(n,k)$.

Next, the signal $M_1(n,k)$ is divided by $|H_1(n,k)|^2$ by means of a divider in the channel equalizer 113 of the branch 11 to generate a first equalized signal $Eo_1(n,k)$. Similarly, a second equalized signal $Eo_2(n,k)$ is generated by the same division operation performed by the channel equalizer 123 of the branch 12. Thus, we obtain:

$$Eo_1(n,k)=S_1(n,k)+\{(H_1^*(n,k)V_1(n,k))/|H_1(n,k)|^2\}$$

$$Eo_2(n,k)=S_2(n,k)+\{(H_2^*(n,k)V_2(n,k))/|H_2(n,k)|^2\} \quad (1.3)$$

Further, the values of the divisors, namely $|H_1(n,k)|^2$ and $|H_2(n,k)|^2$, are fed to the combination/selection unit 1a and serve as reference information for the Viterbi decoder 1b.

Typically, the noise term in Equation 1.3, i.e. $\{(H_1^*(n,k)V_1(n,k))/|H_1(n,k)|^2\}$ or $\{(H_2^*(n,k)V_2(n,k))/|H_2(n,k)|^2\}$, is so small as to be neglected compared to the transmission data $S_1(n,k)$ and $S_2(n,k)$. Hence, the transmission data $S_1(n,k)$ and $S_2(n,k)$ can be extracted after equalization and then respectively transmitted to the soft demappers 114 and 124. The soft demappers 114 and 124 perform symbol demapping on them to respectively generate demapped signals $Sf_1(n,k)$ and $Sf_2(n,k)$ that are fed to the combination/selection unit 1a.

Finally, the combination/selection unit 1a perform either combination or selection on the demapped signals $Sf_1(n,k)$ and $Sf_2(n,k)$ and the channel frequency responses $H_1(n,k)$ and $H_2(n,k)$ according to their response qualities to generate a decode signal E. The decode signal E is transmitted to the Viterbi decoder 1b to generate decoded data O.

During the equalization performed by the conventional diversity receiver 10, a complicated division algorithm as well as a divider is required to provide the divisor values of $|H_1(n,k)|^2$ and $|H_2(n,k)|^2$ for the Viterbi decoder 1b as reference decoding information. However, this may cause complexity in demodulation operations performed by the diversity receiver and may increase manufacturing costs due to the need of the divider.

Moreover, in the conventional design, since the channel weights of different branches set by their respective channel equalizers are equal to each other, the Viterbi decoder 1b can be provided with only channel information but without background noise information about each channel. Therefore, the decoding performance of the Viterbi decoder 1b is difficult to be improved.

BRIEF SUMMARY OF THE INVENTION

Hence, an object of the invention is to provide a diversity receiver for an OFDM system that allows for effectively reducing the operation complexity and manufacturing costs of a diversity receiver.

Another object of the invention is to provide a diversity receiver for an OFDM system having improved decoding performance where background noise information is provided as reference decoding information for a channel decoder.

According to the invention, a diversity receiver for an OFDM system includes N number of Fourier transform circuits, N number of channel estimators, N number of match filters, N number of soft demappers, a combination/selection unit, and a channel decoder. The diversity receiver has N number of branches (N is a positive integer) for receiving M number of versions (M is a positive integer) of input signals. A $P_{th}$ Fourier transform circuit (P is a positive integer, $1 \leq P \leq N$) receives a $Q_{th}$ version input signal (Q is a positive integer; $1 \leq Q \leq M$) and generates a $P_{th}$ frequency-domain signal comprising a $P_{th}$ transmission data. A $P_{th}$ channel estimator generates a $P_{th}$ estimate channel frequency response according to the $P_{th}$ frequency-domain signal. A $P_{th}$ match filter receives the $P_{th}$ frequency-domain signal and generates a $P_{th}$ demodulation signal according to the $P_{th}$ estimate channel frequency response. A $P_{th}$ soft demapper receives the $P_{th}$ demodulation signal and performs symbol mapping on the $P_{th}$ demodulation signal to generate a $P_{th}$ output signal. The combination/selection unit receives N number of output signals and performs either combination or selection on the output signals according to their signal qualities to generate a decode signal. The channel decoder decodes the decode signal to generate decoded data.

Through the design of the invention, a match filter typically applied in time-domain processing is adapted for the frequency-domain processing so as to replace the channel equalizer used in a conventional diversity receiver. The diversity receiver of the invention merges the square of the absolute value of the frequency response and transmission data into a demodulation signal and then outputs it by means of the match filter; on the contrary, the channel equalizer in the conventional diversity receiver needs to divide the values of the output signals by the square of the absolute value of the frequency response and provides the channel decoder with the divisor and the transmission data separately as reference information. Hence, the diversity receiver of the invention needs not to implement the complicated division algorithm and thus may save the cost of a divider. Therefore, the design of the invention may effectively reduce the complexity of demodulation operations of a diversity receiver as well as manufacturing costs.

Further, noise power estimators and multipliers may be also provided in the diversity receiver to generate individual channel weights for each channel, which serve as background noise information for the channel decoder for subsequent treatments so as to improve the decoding performance of the channel decoder.

DETAILED DESCRIPTION OF THE INVENTION

Detail descriptions of the diversity receiver for an OFDM system according to the invention will be provided in the following in order to make the invention thoroughly understood. The symbols n, k, N, M, P, Q used in the following descriptions are positive integers.

Figure 1:
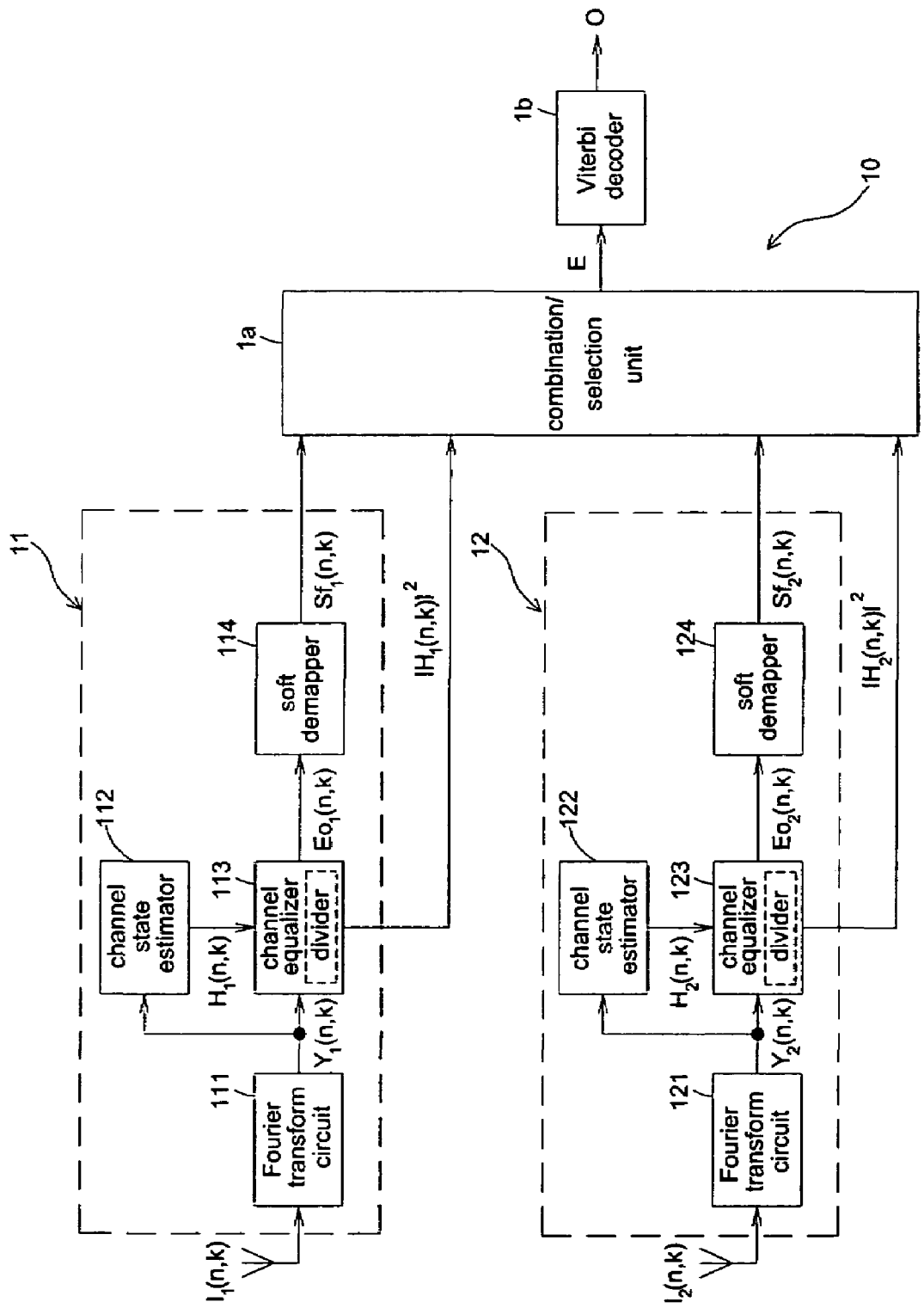
FIG. 1 shows a block diagram illustrating a conventional diversity receiver
Figure 2:
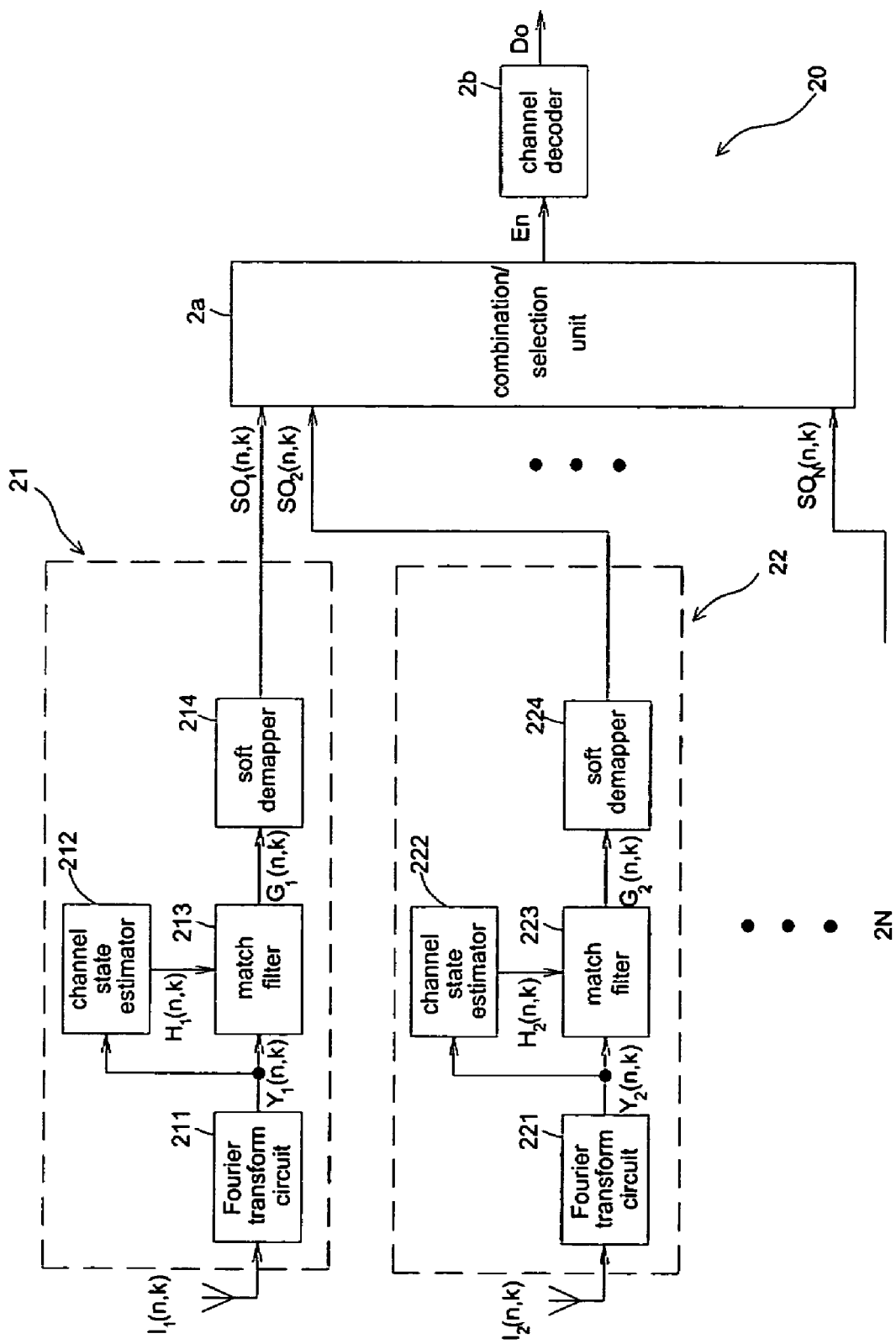
FIG. 2 shows a block diagram illustrating an embodiment of the invention.

FIG. 2 shows a block diagram illustrating an embodiment of the invention. Referring to FIG. 2, the diversity receiver 20 for an OFDM system has N number of branches 21~2N for receiving M number of versions of input signals $I_1(n,k)$~$I_M(n,k)$, where $I_Q(n,k)(1 \leq Q \leq M)$ represents an $Q_{th}$ version input signal of an $n_{th}$ symbol and a $k_{th}$ sub-carrier transmitted from a transmitter. The diversity receiver 20 includes N number of Fourier transform circuits 211~2N1, N number of channel estimators 212~2N2, N number of match filters 213~2N3, N number of soft demappers 214~2N4, a combination/selection unit 2a, and a channel decoder 2b.

The Fourier transform circuits 211~2N1 are respectively provided in branches 21~2N. The $P_{th}$ ($1 \leq P \leq N$) Fourier transform circuit 2P1 receives the $Q_{th}$ version input signal $I_Q(n,k)$ and generates a frequency-domain signal $Y_P(n,k)$. The channel estimators 212~2N2 are respectively provided in branches 21~2N. The $P_{th}$ channel estimator 2P2 generates an estimate channel frequency response $H_P(n,k)$ of the $P_{th}$ channel according to a $P_{th}$ channel reference signal (such as a pilot signal) contained in the frequency-domain signal $Y_P(n,k)$. The match filters 213~2N3 are respectively provided in branches 21~2N. The $P_{th}$ match filter 2P3 receives the $P_{th}$ frequency-domain signal $Y_P(n,k)$ and generates a $P_{th}$ demodulation signal $G_P(n,k)$ according to the estimate channel frequency response $H_P(n,k)$ of the $P_{th}$ channel. The soft demappers 214~2N4 are respectively provided in branches 21~2N. The $P_{th}$ soft demapper 2P4 receives the $P_{th}$ demodulation signal $G_P(n,k)$ and performs symbol mapping on it to generate a $P_{th}$ output signal $SO_P(n,k)$. The combination/selection unit 2a receives N output signals $SO_1(n,k)$~$SO_N(n,k)$ and performs either combination or selection on them according to their signal qualities to generate a decode signal En. The decode signal En is transmitted to the channel decoder 2b to generate decoded data Do. The channel decoder 2b may be a Viterbi decoder or a Reed-Solomon decoder.

The operations of the diversity receiver 20 are described as the following where the first and the second branches 21 and 22 are taken as examples. Other branches are similar in operation and thus not explaining in detail.

Referring to FIG. 2, when a transmitter (not shown) transmits a first version input signal $I_1(n,k)$ regarding a $n_{th}$ symbol and a $k_{th}$ sub-carrier to the diversity receiver 20, the Fourier transform circuit 211 of the first branch 21 receives the first version input signal $I_1(n,k)$ via an antenna and transforms it into a first frequency-domain signal $Y_1(n,k)$. On the other hand, when the transmitter transmits a second version input signal $I_2(n,k)$ regarding a $n_{th}$ symbol and a $k_{th}$ sub-carrier to the diversity receiver 20, the Fourier transform circuit 221 of the branch 22 receives the input signal $I_2(n,k)$ via an antenna and transforms it into a second frequency-domain signal $Y_2(n,k)$. The fourier transform circuit 211 and the fourier transform circuit 221 separately receive the first version input signal $I_1(n,k)$ and an second version input signal $I_2(n,k)$. Note that the first version input signal $I_1(n,k)$ and the second version input signal $I_2(n,k)$ include the same data but are distinguished as being transmitted via different antenna path or at different time.

The frequency responses of the first and second frequency-domain signals $Y_1(n,k)$ and $Y_2(n,k)$ can be expressed as a mathematical model listed below:

$$Y_1(n,k)=H_1(n,k)S_1(n,k)+V_1(n,k)$$

$$Y_2(n,k)=H_2(n,k)S_2(n,k)+V_2(n,k) \quad (2.1)$$

where $H_1(n,k)$ and $H_2(n,k)$ are channel frequency responses of the first version input signals $I_1,(n,k)$ and the second version input signal $I_2(n,k)$, $S_1,(n,k)$ and $S_2(n,k)$ are first and second transmission data transmitted from the transmitter, and $V_1(n,k)$ and $V_2(n,k)$ are first and second additive white Gaussian noises. The relationship between additive white Gaussian noises of two different channels is given by:

$$\sigma_{v_1}^2 \neq \sigma_{v_2}^2$$

which indicates the signal variants for the first branch 21 are different to that of the second branch 22, i.e. the background noises $V_1(n,k)$ and $V_2(n,k)$ are different to each other. However, it should be noted that the above relationship does not mean the background noises $V_1(n,k)$ and $V_2(n,k)$ are completely unrelated.

The first channel estimator 212 fetches the first frequency-domain signal $Y_1(n,k)$ and evaluates the estimate value of the first channel frequency response $H_1(n,k)$ according to a reference signal (such as a pilot signal) contained in the first frequency-domain signal $Y_1(n,k)$. Then, the estimate value of the response $H_1(n,k)$ is transmitted to the match filter 213. Similarly, the second channel estimator 222 transmits the estimate value of the second channel frequency response $H_2(n,k)$ to the match filter 223. The match filter 213 receives the first frequency-domain signal $Y_1(n,k)$ and generates a first demodulation signal $G_1(n,k)$ according to the estimate value of the frequency response $H_1(n,k)$. Similarly, the second match filter 223 generates a second demodulation signal $G_2(n,k)$. The signals $G_1(n,k)$ and $G_2(n,k)$ are given by the mathematical model listed below:

$$G_1(n,k)=|H_1(n,k)|^2 S_1(n,k)+H_1^*(n,k)V_1(n,k)$$

$$G_2(n,k)=|H_2(n,k)|^2 S_2(n,k)+H_2^*(n,k)V_2(n,k) \quad (2.2)$$

where $H_1^*(n,k)$ and $H_2^*(n,k)$ are respective complex conjugates of $H_1(n,k)$ and $H_2(n,k)$.

Typically, the noise terms in Equation (2.2), namely $H_1^*(n,k)V_1(n,k)$ and $H_2^*(n,k)V_2(n,k)$, are so small as to be neglected compared to the multiplication of the transmission data and the square of the absolute value of the frequency response (i.e., $|H_1(n,k)|^2 S_1(n,k)$ and $|H_2(n,k)|^2 S_2(n,k)$). Hence, Equation (2.2) can be simplified and written as:

$$G_1(n,k)=|H_1(n,k)|^2 S_1(n,k)$$

$$G_2(n,k)=|H_2(n,k)|^2 S_2(n,k) \quad (2.3)$$

Note that, at this stage, the multiplications ($|H_1(n,k)|^2 S_1(n,k)$ and $|H_2(n,k)|^2 S_2(n,k)$) are directly output by the match filter 213 and 223. Specifically, compared to the conventional method where the equalized signal is divided by the square of the absolute value of the frequency response ($|H_1(n,k)|^2$ or $|H_2(n,k)|^2$), the diversity receiver 20 of the invention needs not to perform any complicated division operation. Then, the first and the second soft demappers 214 and 224 respectively receive the first and the second demodulation signal $G_1(n,k)$ and $G_2(n,k)$ and perform symbol demapping to generate a first and a second output signals $SO_1(n,k)$ and $SO_2(n,k)$ after determining whether to adjust data boundaries or not. The combination/selection unit 2a receives the first and the second output signals $SO_1(n,k)$ and $SO_2(n,k)$ and performs either combination or selection on them according to their signal qualities to generate a decode signal En. Finally, the decode signal En is transmitted to the channel decoder 2b to generate decoded data Do.

Through the design of the invention, a match filter typically applied in time-domain processing is adapted for the frequency-domain processing so as to replace the channel equalizer used in a conventional diversity receiver. The diversity receiver 20 of the invention merges the square of the absolute value of the frequency response (such as $|H_1(n,k)|^2$) and transmission data (such as $S_1(n,k)$) into a demodulation signal (such as $G_1(n,k)$) and then outputs it by means of the match filter; on the contrary, the channel equalizer in the conventional diversity receiver 10 needs to divide the values of the output signals by the square of the absolute value of the frequency response (such as $|H_1(n,k)|^2$) and provides the channel decoder with the divisor ($|H_1(n,k)|^2$) and the transmission data ($S_1(n,k)$) separately as reference information. Hence, the diversity receiver 20 of the invention needs not to implement the complicated division algorithm and thus may save the cost of a divider to achieve the same result where the reference channel information regarding the square of the absolute value of the frequency response and the transmission data is indeed provided for the channel decoder. Therefore, the design of the invention may effectively reduce the complexity of demodulation operations of a diversity receiver as well as manufacturing costs.

Figure 3:
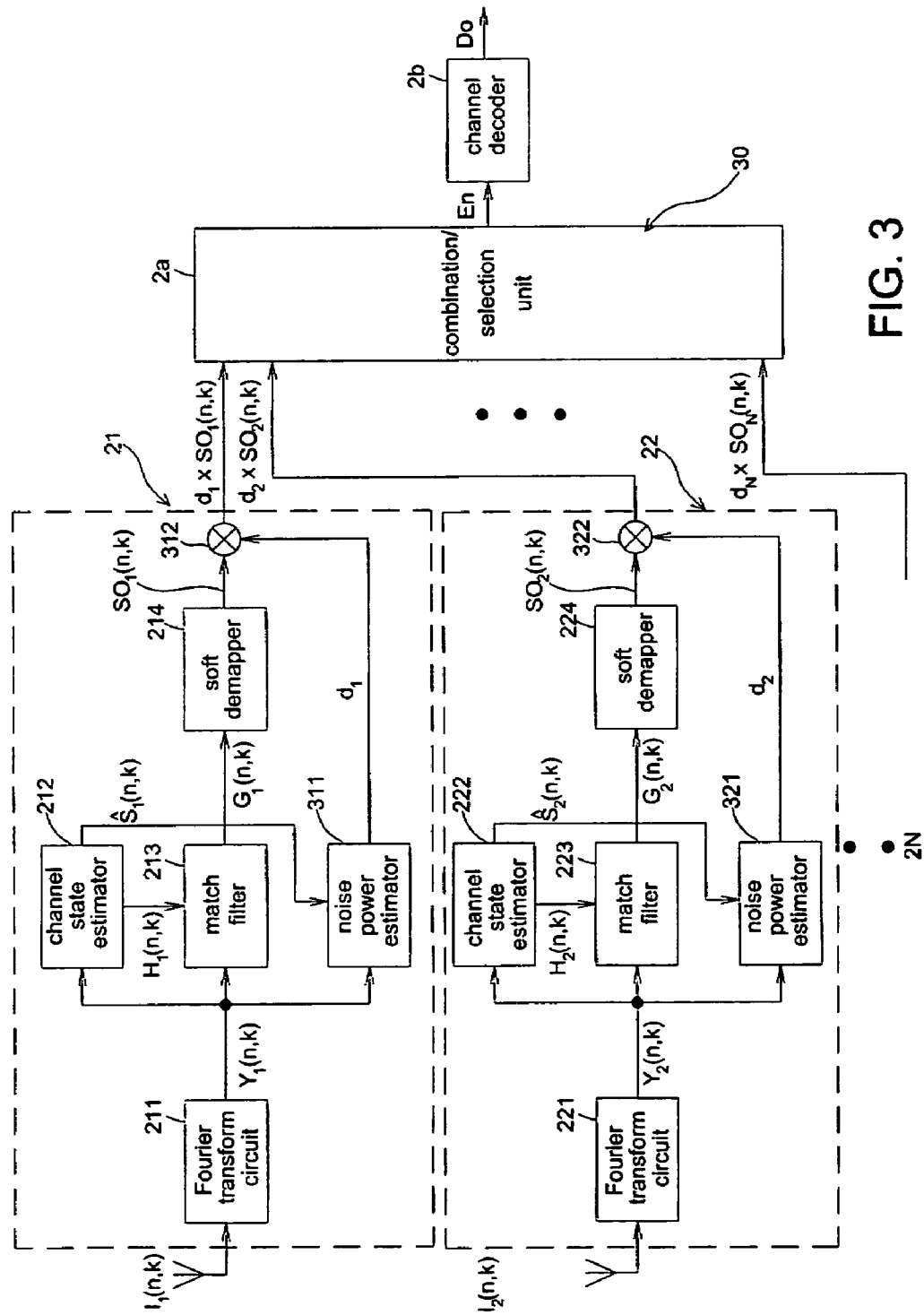
FIG. 3 shows a block diagram illustrating an embodiment of the invention.

FIG. 3 shows a block diagram illustrating another embodiment according to the invention. Referring to FIG. 3, the diversity receiver 30 for an OFDM system has N number of branches 21~2N for receiving M number of versions of input signals $I_1(n,k)$~$I_M(n,k)$. The diversity receiver 30 includes N number of Fourier transform circuits 211~2N1, N number of channel estimators 212~2N2, N number of match filters 213~2N3, N number of soft demappers 214~2N4, N number of noise power estimators 311~3N1, N number of multipliers 312~3N2, a combination/selection unit 2a, and a channel decoder 2b. The architecture and operation principle of the diversity receiver 30 is similar to those of the diversity receiver 20, except each branch of the diversity receiver 30 is additionally provided with a noise estimator 3P1 and a multiplier 3P2.

Similarly, the first and the second branches 21 and 22 are taken as examples for illustrating the operations of the diversity receiver 30. First, the first channel estimator 212 evaluates a first estimate transmission value $\hat{S}_1(n, k)$ according to a first channel reference signal (such as a pilot signal) contained in the first frequency-domain signal $Y_1(n,k)$. Then, the first noise power estimator 311 receives the first frequency-domain signal $Y_1(n,k)$ and generates a first channel weight $d_1$ according to the first estimate transmission value $\hat{S}_1(n, k)$. The first multiplier 312 multiplies the first output signal $SO_1(n,k)$ generated by the first soft demapper 214, namely soft$\{|H_1(n,k)|^2 S_1(n,k)\}$, by the first channel weight $d_1$ and then outputs the multiplication $d_1 \times SO_1(n,k)$. The second noise estimator 321 in the second branch 22 receives the second frequency-domain signal $Y_2(n,k)$ and generates a second channel weight $d_2$ according to a second estimate transmission value $\hat{S}_2(n,k)$. The second multiplier 322 multiplies the second output signal $SO_2(n,k)$ generated by the second soft demapper 224, namely soft$\{|H_2(n,k)|^2 S_2(n,k)\}$, by the second channel weight $d_2$ and then outputs the multiplication $d_2 \times SO_2(n,k)$. The combination/selection unit 2a receives the first and the second output signals $d_1 \times SO_1(n,k)$ and $d_2 \times SO_2(n,k)$ and performs either combination or selection on the output signals according to their signal qualities to generate a decode signal En. For example, if the combination treatment is performed on the output signals $d_1 \times SO_1(n,k)$ and $d_2 \times SO_2(n,k)$, the mathematical model of the decode signal En can be written:

$$En = d_1 \times \text{soft}\{|H_1(n,k)|^2 S_1(n,k)\} + d_2 \times \text{soft}\{|H_2(n,k)|^2 S_2(n,k)\} \quad (2.4)$$

Finally, the decode signal En is transmitted to the channel decoder 2b to generate decoded data Do.

Also, the first and the second channel weights $d_1$ and $d_2$ can be obtained:

$$d_1/d_2 = E\{|V_2^{\%}(n,k)|^2\}/E\{|V_1^{\%}(n,k)|^2\} \quad (2.4)$$

$$E\{|V_1^{\%}(n,k)|^2\} = E\{|Y_1(n,k) - H_1(n,k)\hat{S}_1(n,k)|^2\}$$

$$E\{|V_2^{\%}(n,k)|^2\} = E\{|Y_2(n,k) - H_2(n,k)\hat{S}_2(n,k)|^2\} \quad (2.5)$$

As shown in Equation 2.4, the first and the second channel weights $d_1$ and $d_2$ are in inverse proportion to the mean square deviations of the estimate background noises $V_1$ and $V_2$. Also, the estimation equation of the estimate background noises $V_1$ and $V_2$ are shown in Equation 2.5. From the Equation 2.4 and Equation 2.5, it is seen the first channel weight $d_1$ is in inverse proportion to the second channel weight $d_2$. Certainly, for the condition of more than two branches, the channel weights $d_1 \sim d_N$ can be written as:

$$d_1 \cdot SO_1(n,k) = d_2 \cdot SO_2(n,k) = \ldots = d_N \cdot SO_N(n,k); \text{ or}$$

$$\{d_1 : d_2 : \ldots : d_N\} = \{1/E\{|V_1(n,k)|^2\} : 1/E\{|V_2(n,k)|^2\} : \ldots : 1/E\{|V_N(n,k)|^2\}\}$$

Hence, it is seen an $N_{th}$ channel weight $d_N$ is in inverse proportion to an $(N-1)_{th}$ channel weight $d_{1-N}$. According to the invention, except the match filters are used to omit the need of a divider, the noise power estimators are also provided to generate individual channel weights $d_1 \sim d_N$ for each channel, which serve as background noise information for the channel decoder 2b for subsequent treatments so as to improve the decoding performance of the channel decoder 2b. Further, the diversity receiver of the invention may implement various techniques of diversity reception, such as frequency diversity, antenna spatial diversity, antenna polarization diversity, and antenna pattern diversity.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A diversity receiver for an orthogonal frequency division multiplexing (OFDM) system having N number of branches (N is a positive integer) for receiving M number of versions (M is a positive integer) of input signals, comprising:
    N number of Fourier transform circuits respectively provided in the N number of branches, wherein a $P_{th}$ Fourier transform circuit (P is a positive integer; $1 \leq P \leq N$) receives a $Q_{th}$ version input signal (Q is a positive integer; $1 \leq Q \leq M$) and generates a $P_{th}$ frequency-domain signal;
    N number of channel estimators respectively provided in the N number of branches, wherein a $P_{th}$ channel estimator generates a $P_{th}$ estimate channel frequency response according to the $P_{th}$ frequency-domain signal;
    N number of match filters respectively provided in the N number of branches, wherein a $P_{th}$ match filter receives the $P_{th}$ frequency-domain signal and generates a $P_{th}$ demodulation signal according to the $P_{th}$ estimate channel frequency response;
    N number of soft demappers respectively provided in the N number of branches, wherein a $P_{th}$ soft demapper receives the $P_{th}$ demodulation signal and performs symbol mapping on the $P_{th}$ demodulation signal to generate a $P_{th}$ output signal;
    wherein the $P_{th}$ frequency-domain signal comprises a $P_{th}$ reference signal, and the $P_{th}$ channel estimator generates a $P_{th}$ estimate transmission value according to the $P_{th}$ reference signal;
    N number of noise power estimators respectively provided in the N number of branches, wherein a $P_{th}$ noise power estimator receives the $P_{th}$ frequency-domain signal and generates a $P_{th}$ channel weight according to the $P_{th}$ estimate transmission value; and
    N number of multipliers respectively provided in the N number of branches, wherein a $P_{th}$ multiplier multiplies the $P_{th}$ output signal by the $P_{th}$ channel weight to output a $P_{th}$ multiplication.

2. The diversity receiver as claimed in claim 1, wherein the $P_{th}$ frequency-domain signal comprises a $P_{th}$ transmission data, and the $P_{th}$ demodulation signal comprises the multiplication of the $P_{th}$ transmission data and a square of the absolute value of the $P_{th}$ estimate channel frequency response.

3. The diversity receiver as claimed in claim 1, further comprising a combination/selection unit for receiving N number of output signals and performing either combination or selection on the output signals according to their signal qualities to generate a decode signal.

4. The diversity receiver as claimed in claim 3, further comprising a channel decoder for decoding the decode signal to generate decoded data.

5. The diversity receiver as claimed in claim 4, wherein the channel decoder is a Viterbi decoder or a Reed-Solomon decoder.

6. The diversity receiver as claimed in claim 1, wherein the $P_{th}$ reference signal is a pilot signal.

7. The diversity receiver as claimed in claim 1, wherein the $P_{th}$ channel weight is in inverse proportion to a $(P-1)_{th}$ channel weight.

8. A diversity receiver for an orthogonal frequency division multiplexing (OFDM) system, comprising:
    a channel estimator for generating an estimate channel frequency response according to a frequency-domain signal;
    a match filter for receiving the frequency-domain signal and generating a demodulation signal according to the estimate channel frequency response;
    wherein the frequency-domain signal comprises a reference signal, and the channel estimator generates an estimate transmission value according to the reference signal;
    a noise power estimator for receiving the frequency-domain signal and generating a channel weight according to the estimate transmission value; and a multiplier for multiplying the output signal by the channel weight to output a multiplication.

9. The diversity receiver as claimed in claim 8, further comprising a Fourier transform circuit for receiving an input signal and generating the frequency-domain signal, wherein the frequency-domain signal comprises a transmission data, and the demodulation signal comprises a multiplication of the transmission data and the square of the absolute value of the estimate channel frequency response.

10. The diversity receiver as claimed in claim 8, further comprising a soft demapper for receiving the demodulation signal and performing symbol mapping on the demodulation signal to generate an output signal.

11. The diversity receiver as claimed in claim 8 wherein the reference signal is a pilot signal.

12. A diversity receiver for an orthogonal frequency division multiplexing (OFDM) system for receiving M number of versions (M is a positive integer) of input signals at different time, comprising:
   a Fourier transform circuit for receiving a $Q_{th}$ version input signal (Q is a positive integer; $1 \leq Q \leq M$) and generating a $P_{th}$ (P is a positive integer; $1 \leq P \leq M$) frequency-domain signal;
   a channel estimator for generating a $P_{th}$ estimate channel frequency response according to the $P_{th}$ frequency-domain signal;
   a match filter for receiving the $P_{th}$ frequency-domain signal and generating a $P_{th}$ demodulation signal according to the $P_{th}$ estimate channel frequency response;
   a soft demapper for receiving the $P_{th}$ demodulation signal and performing symbol mapping on the $P_{th}$ demodulation signal to generate a $P_{th}$ output signal; wherein the $P_{th}$ frequency-domain signal comprises a $P_{th}$ reference signal which is a pilot signal, and the channel estimator generates a $P_{th}$ estimate transmission value according to the $P_{th}$ reference signal;
   a noise power estimator for receiving the $P_{th}$ frequency-domain signal and generating a $P_{th}$ channel weight according to the $P_{th}$ estimate transmission value, wherein the $P_{th}$ channel weight is in inverse proportion to a $(P-1)_{th}$ channel weight;
   a multiplier for multiplying the $P_{th}$ output signal by the $P_{th}$ channel weight to output a $P_{th}$ multiplication;
   a combination/selection unit for receiving M number of multiplications and performing either combination or selection on the multiplications according to their signal qualities to generate a decode signal; and
   a channel decoder for decoding the decode signal to generate decoded data.

13. A diversity receiver for an orthogonal frequency division multiplexing (OFDM) system having N number of branches (N is a positive integer) for receiving M number of versions (M is a positive integer) of input signals, comprising:
   N number of Fourier transform circuits respectively provided in the N number of branches, wherein a $P_{th}$ Fourier transform circuit (P is a positive integer; $1 \leq P \leq N$) receives a $Q_{th}$ version input signal (Q is a positive integer; $1 \leq Q \leq M$) and generates a $P_{th}$ frequency-domain signal;
   N number of channel estimators respectively provided in the N number of branches, wherein a $P_{th}$ channel estimator generates a $P_{th}$ estimate channel frequency response according to the $P_{th}$ frequency-domain signal;
   N number of match filters respectively provided in the N number of branches, wherein a $P_{th}$ match filter receives the $P_{th}$ frequency-domain signal and generates a $P_{th}$ demodulation signal according to the $P_{th}$ estimate channel frequency response;
   N number of soft demappers respectively provided in the N number of branches, wherein a Pth soft demapper receives the Pth demodulation signal and performs symbol mapping on the Pth demodulation signal to generate a Pth output signal; wherein the Pth frequency-domain signal comprises a Pth reference signal, and the Pth channel estimator generates a Pth estimate transmission value according to the Pth reference signal; and
   N number of noise power estimators respectively provided in the N number of branches, wherein a Pth noise power estimator receives the Pth frequency-domain signal and generates a Pth channel weight according to the Pth estimate transmission value; wherein the Pth channel weight is in inverse proportion to a (P−1)th channel weight.

14. The diversity receiver as claimed in claim 13, wherein the $P_{th}$ frequency-domain signal comprises a $P_{th}$ transmission data, and the $P_{th}$ demodulation signal comprises the multiplication of the $P_{th}$ transmission data and a square of the absolute value of the $P_{th}$ estimate channel frequency response.

15. The diversity receiver as claimed in claim 13, further comprising a combination/selection unit for receiving N number of output signals and performing either combination or selection on the output signals according to their signal qualities to generate a decode signal.

16. The diversity receiver as claimed in claim 15 further comprising a channel decoder for decoding the decode signal to generate decoded data.

17. The diversity receiver as claimed in claim 16, wherein the channel decoder is a Viterbi decoder or a Reed-Solomon decoder.

18. The diversity receiver as claimed in claim 13, wherein the $P_{th}$ reference signal is a pilot signal.

* * * * *